United States Patent [19]
Stokes

[11] 4,308,807
[45] Jan. 5, 1982

[54] APPARATUS FOR PYROLYSIS OF MUNICIPAL WASTE UTILIZING HEAT RECOVERY

[76] Inventor: Samuel L. Stokes, 17101 Usher Pl., Upper Marlboro, Md. 20870

[21] Appl. No.: 130,811

[22] Filed: Mar. 17, 1980

[51] Int. Cl.³ .............................................. F23G 5/00
[52] U.S. Cl. .................................. 110/257; 110/187; 110/248; 110/346
[58] Field of Search ............... 110/242, 248, 255, 266, 110/257-259, 295, 346, 169

[56] References Cited

U.S. PATENT DOCUMENTS

| | | | |
|---|---|---|---|
| 2,015,052 | 9/1935 | Hantley | 110/346 |
| 3,776,150 | 12/1973 | Evans et al. | 110/346 |
| 3,780,676 | 12/1973 | Hazzard et al. | 110/187 |
| 4,084,521 | 4/1978 | Herbold et al. | 110/346 |
| 4,170,183 | 10/1979 | Cross | 110/257 |
| 4,182,246 | 1/1980 | Lombana et al. | 110/346 |

Primary Examiner—Henry C. Yuen
Attorney, Agent, or Firm—Dennison, Meserole, Pollack & Scheiner

[57] ABSTRACT

Apparatus for pyrolytically treating municipal and other waste comprised of solid heat-decomposable material by radiative heating from an open flame and convective heating, the invention particularly provides for heat recovery of a substantial amount of initial energy input. In the several embodiments of the invention, the source of initial heat energy input can vary from gasification of renewable fuel such as wood chips and the like to burning of a primary fuel, such energy input being preferably augmented by burning of at least a portion of the gaseous pyrolytic decomposition gases produced by treatment of the waste. Heat generated during the process of pyrolyzing waste is also utilized to warm combustion air as well as recovered to the extent possible for heating purposes or for the accomplishment of useful work. The present apparatus further provides particular structure capable of handling the waste both prior to and subsequent to subjection to the pyrolysis process, the apparatus also including particular structure for holding the waste during the pyrolysis process.

8 Claims, 4 Drawing Figures

APPARATUS FOR PYROLYSIS OF MUNICIPAL WASTE UTILIZING HEAT RECOVERY

BACKGROUND OF THE INVENTION

1. Field of the Invention

The invention relates generally to solid waste disposal and particularly to disposal of solid municipal waste by pyrolytic treatment.

2. Description of the Prior Art

Liquid and solid waste disposal has become a particularly acute problem in urban areas due to population density patterns and air and water quality considerations. Longused methods of municipal waste disposal have become increasingly less satisfactory as available land near urban centers has virtually disappeared due to population pressures, and as air and water quality considerations have lessened the attractiveness of waste incineration practices.

A widely employed method for the disposal of solid municipal waste is the "land-fill" procedure which involves mixing of the waste with soil and the eventual covering over of the waste with a top layer of earth. Problems now being encountered with such prior practices include the vanishing availability of suitable land-fill sites within reasonable distances of urban areas. The terrain of suitable land-fill sites must be such that the waste can be covered over. Even when such sites are available in an urban area, citizen resistance to the location of a landfill near human habitation is increasingly strident. The siting of land-fills outside of the urban area can result in inordinate expenses for transport of the waste to the land-fill site as energy costs increasingly become a major factor. Of further concern is the fact that the disposal of waste in a land-fill has often proven to be hazardous due to the nature of the waste or due to uneven settling of the land-fill site which prevents previously intended conversion of the site to other uses.

The most widely used alternative to land-fill waste disposal is incineration, typically in forced air incinerators. Incineration, due to the necessity of handling large volumes of gases bearing combustion products, results in pollution of the atmosphere. When incineration is carried out in the urban area itself, as is usually the case due to the need to locate a waste disposal system near the source of the waste, air quality within the urban area is adversely affected. Removal of pollutants from the gases issuing from such incinerators cannot be practically accomplished, even partial removal being costly.

The disadvantages of land-fill and incineration methods have shown the need for alternate waste disposal methods. A technique generally referred to as pyrolysis holds the promise for relatively pollution-free and odor-free treatment of solid municipal waste. The solid residue resulting from a pyrolysis process is typically non-putrefiable and non-pathogenic, thereby facilitating disposal of the "ash" or "char" which results from such processes.

Even though pyrolysis techniques offer a number of theoretical advantages, pyrolysis waste disposal systems have not achieved widespread commercial use. This failure of pyrolysis technology to achieve a clearly acceptable status in the art involves at least in part certain heat transfer problems and the tendency of such systems to form "slag" in the pyrolysis chamber. In order to produce substantially odor-free end products, it is necessary to heat the decomposition products to a temperature which approaches that temperature at which slagging is encountered. However, if the temperature in the pyrolysis chamber is allowed to rise above this slagging temperature, glass and other inorganic materials melt to form a tenaciously adhering slag over all surfaces exposed to the waste. This slag actually "freezes" the pyrolysis apparatus and can only be removed by extremely tedious mechanical methods. One advantage of the present pyrolysis system is the ability to effectively heat the decomposable waste in an efficient manner such that the temperature within the pyrolysis chamber can be more readily controlled.

SUMMARY OF THE INVENTION

The present invention provides pyrolysis apparatus which intends improvement over prior systems in that a substantial amount of initial energy input is recovered for use either in the pyrolysis process or for non-associated heating applications. Improvement further obtains from the particular structure employed according to the invention for handling the heat-decomposable waste within the pyrolysis chamber itself. According to the several embodiments of the invention, waste is caused to enter the pyrolysis chamber at an upper portion thereof and is progressively fed downwardly in either a gradually-descending spiral fashion or by a vertical passage through grates of decreasing width. In every embodiment, the descending waste is pre-heated and/or pyrolyzed during descent within the pyrolysis chamber, thereby enabling the temperature of the waste within the chamber to more readily attain a value below a critical slagging temperature and to be more readily held at this temperature while heating the decomposition products sufficiently to eliminate odors from the residue issuing from the chamber.

Prior to introduction of waste into any of the several embodiments of the invention, the waste which is to by pyrolyzed is similarly treated. This pre-treatment typically involves shredding and air classification, certain non-decomposable materials being removed from the waste by virtue of the classification process. The waste material which is to be subjected to pyrolysis can then be charged into the pyrolysis reactor chamber such as by hydraulic ram-type packing mechanisms. In a first embodiment of the invention, the waste is charged through a gas-type charging gate disposed in the upper portion of the pyrolysis chamber and onto a landing forming the uppermost portion of a downwardly spiraling firing rack. The spiral firing rack effectively occupies at least the upper half of the zone within which pyrolysis occurs. The waste material is forced downwardly along the spiral firing rack by the force of other waste being continuously charged into the system. At the lowermost landing of the spiral firing rack, the now-heated waste falls onto a stepped grating and is subjected to radiative heating from a supplementary fuel burner to further pyrolyze said waste. Feeding of the waste along the spiral firing rack allows suspension of the waste in the pyrolyzing atmosphere of hot, non-oxidizing gases which exist in the pyrolysis chamber, the waste decomposing into oxidizable and other gaseous constituents as said waste is progressively fed downwardly. Thorough decomposition occurs on discharge of the at least partially pyrolyzed waste onto the stepped grating which lies immediately below the spiral firing rack and in proximity to the supplementary fuel burner. Ash and char fall through the stepped grating to an open container disposed beneath the grating, this residue being compacted or otherwise contained for disposal. The relatively low volume residue is non-putrefiable and non-pathogenic, and, as such, is more easily disposable than is the waste material from which the residue is formed. Sealing of the zone into which the residue falls can be accomplished in a variety of ways including biasing of portions of the residue containers against lower portions of the pyrolysis chamber to effect a seal.

In a second embodiment of the invention, a vertical series of firing racks having spaced support members are disposed within a pyrolysis chamber, the waste being discharged onto the uppermost firing rack through an aperture formed in the wall of the chamber in an upper portion thereof. The waste is moved along the uppermost firing rack and subjected while on the rack to the pyrolyzing atmosphere within the chamber. The charging of the uppermost firing rack with fresh waste pushes the heated waste from the uppermost firing rack to a weight-sensitive firing rack disposed beneath said uppermost firing rack. When a predetermined quantity of waste falls onto the weight-sensitive firing rack, a signal is generated by associated electronics to discontinue the feed of waste onto the uppermost firing rack. Feed into the pyrolysis chamber is therefore intermittent and is controlled by the weight of waste charged into the system.

As the waste on the weight-sensitive firing rack is decomposed, the weight of the waste is reduced, thereby resulting in the reactivation of feed to the uppermost firing rack. Waste decomposing on the weight-sensitive firing rack is reduced in mass and is forced between the spaced support members forming the rack onto the surface of a third firing rack spaced below the weightsensitive firing rack. The spacing between support members of the firing racks become progressively smaller with vertical descent within the chamber. The at least partially pyrolyzed waste held on the third firing rack is at that point closest to the supplementary fuel burner and is subjected to strong radiative heat gain to complete pyrolysis decomposition. The third firing rack is hinged so that residue not capable of falling through the grating formed by the support members can be removed by tilting of the rack.

In both embodiments of the invention, the pyrolytically-produced gases are preferably ducted from the pyrolysis chamber by venting through an outlet conduit which communicates with the pyrolysis chamber at the upper portion thereof. The gases thus produced can be used to fuel the pyrolysis reaction or can be used in other ways. A particular feature of the several embodiments of the invention is the effective suspension of the waste within the pyrolytic atmosphere existing in the pyrolysis chamber, this suspension allowing a more effective contact between the waste and the hot, non-oxidizing gases which decompose the waste. Pyrolysis thus at least partially occurs while the waste is moving vertically downward within the pyrolysis chamber, thereby obviating the need for all pyrolytic action to occur only when the waste is brought into the immediate vicinity of the supplementary fuel burner.

The second embodiment of the invention above-described, can also be provided with a heat exchange wall element which separates the pyrolysis chamber from a steam generation chamber disposed above said pyrolysis chamber. Preheated water introduced into the steam generation chamber is vaporized by heat from the pyrolysis chamber conducted through the heat exchange wall element. The steam thus generated is ducted to a desired point of use. Steam generation can also occur according to the invention by the provision of piping extending through upper portions of the pyrolysis chamber. The piping carries water which is heated by heat exchange from the pyrolyzing gases through the piping.

It is therefore an object of the invention to provide apparatus for pyrolytically treating municipal waste comprised of solid heat-decomposable material, the apparatus partially providing structure for feeding the waste into and within a pyrolysis chamber to allow suspension of the waste in contact with the hot, non-oxidizing atmosphere existing in the pyrolysis chamber.

It is a further object of the invention to provide apparatus for recovering a substantial portion of the initial energy input necessary to produce the pyrolysis reaction.

It is another object of the invention to provide pyrolysis apparatus capable of using various fuel sources for providing energy input to the reaction.

It is still a further object of the invention to provide structure capable of efficiently handling waste which is to be introduced into a pyrolysis reaction chamber, the structure acting to handle the waste before, during and after introduction into said chamber.

Further objects and advantages of the invention will become more readily apparent in light of the following detailed description of the preferred embodiments of the invention.

DESCRIPTION OF THE PREFERRED EMBODIMENTS

Figure 1:
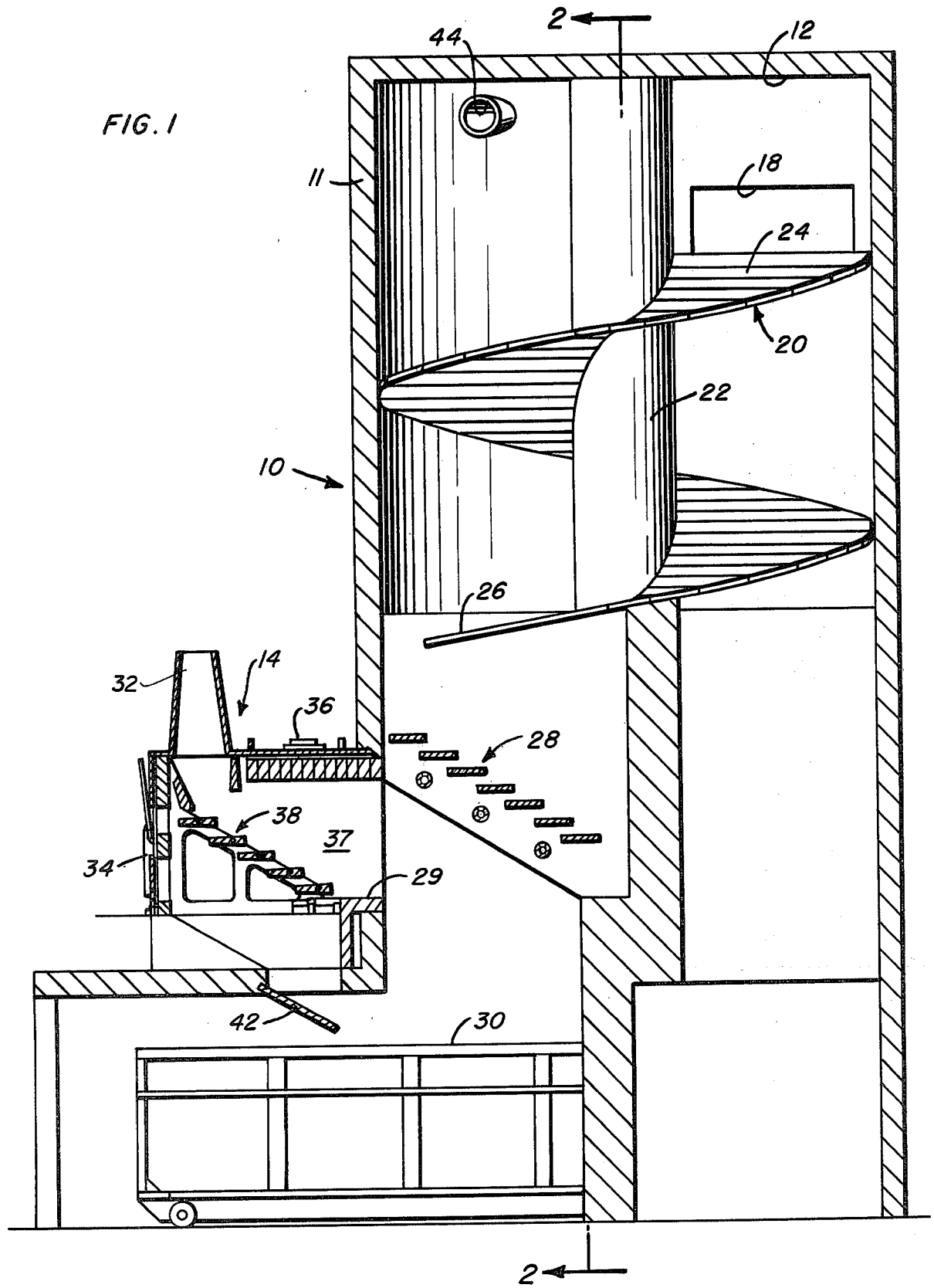
FIG. 1 is an elevational view in partial section illustrating a first embodiment of the invention, the pyrolysis chamber and supplementary fuel burning apparatus being particularly shown.
Figure 2:
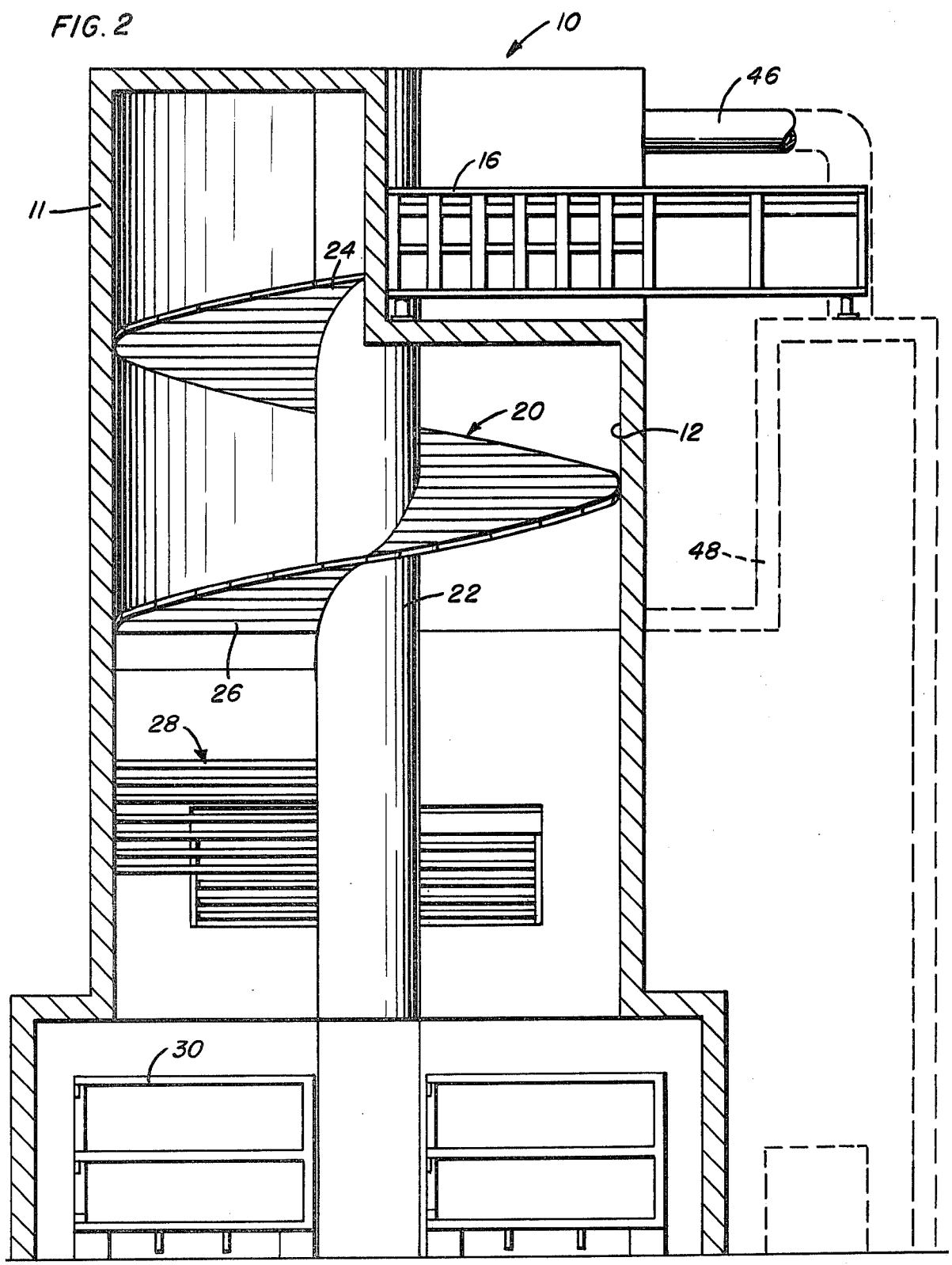
FIG. 2 is an elevational view in partial section taken along line 2—2 of FIG. 1.

Referring now to FIGS. 1 and 2, the portion of a pyrolysis system 10 to which the invention particularly relates is shown in section. It is to be understood that a facility within which the pyrolysis system 10 is located would also comprise a receiving and storage area for receiving solid heatdecomposable material such as municipal trash or garbage which is to be processed in the system 10. The receiving, storage and handling of such waste materials is known in the art. For example, a receiving area or particular receptacle intended to receive waste usually constitutes a metal hopper or concrete pit arranged with a rim thereof at or near surface level so that trucks transporting material to the processing site can be readily unloaded. Material thus received is typically transported by conveyor to a conventional shredder (not shown). Suitable conveyors are typically belt conveyors or drag chain conveyors such as are conventionally employed for transporting materials in a continuous fashion. Suitable shredders are presently in use for shredding junk automobile bodies and other solid waste. The shredder must particularly be capable of dividing the solid material into properly sized pieces which can be readily handled and economically heated to a pyrolysis temperature. Such shredded pieces typically have a mean particle size of not more than approximately four to eight inches and preferably not more than approximately two to three inches. However, the mean particle size of the shredded pieces should be at least 1/32" and preferably at least ¼".

After shredding, the waste material typically undergoes an air classification process according to conventional practices employed at pyrolysis process sites. During air classification, certain materials which cannot effectively be pyrolyzed are removed from the waste. The shredded and classified waste can either be stored prior to pyrolysis or can be immediately subjected to the pyrolysis process. In either situation, the shredded and classified waste is conveyed in a known manner to a ram feeder 16 disposed at the upper portion of pyrolysis housing 11. The ram feeder 16 is seen to communicate with the interior of pyrolysis reactor chamber 12 through waste inlet 18 disposed in a wall of the housing 11. The housing 11 is effectively sealed from ambient and preferably takes the form of a right circular cylinder.

The ram feeder 16 typically takes the form of an industrial service compactor such as is produced by the Marathon Equipment Company of Vernon, Ala., and which conforms to applicable ANSI Z245.1-1975 safety standards. The ram feeder 16 is charged with the shredded and classified waste at an outermost end thereof, the waste being compacted and charged into the pyrolysis chamber 12 through the waste inlet 18 as aforesaid. Sealing of the waste inlet 18 relative to the ram feeder 16 is accomplished according to conventional means. Although the rate at which waste material is charged into the pyrolysis chamber 12 depends upon a number of factors including particularly the size of the chamber 12 and the energy being directed into said chamber, a typical ram feeder would convey waste into the chamber 12 at a rate of approximately 50 cubic yards per hour. The waste is charged on to an upper landing end 24 of a spiral firing rack 20, the end 24 of the firing rack 20 being located in the uppermost portion of the pyrolysis chamber 12. The spiral firing rack 20 is particularly seen to descend in a helical screw-like fashion downwardly into the interior of the chamber 12. The spiral firing rack 20 is mounted along inner portions to a central support column 22 and follows along outer edge portions the arcuate interior walls of the chamber 12.

The waste charged onto the spiral firing rack 20 is moved downwardly on said rack by the force of new waste material being charged into the chamber 12 by the ram feeder 16. The waste moves along the firing rack 20 in a spiraling path until reaching lower landing end 26 of said rack 20. While undergoing this spiraling movement through the upper portion of the pyrolysis chamber 12, the waste is effectively suspended within an atmosphere of hot, non-oxidizing gases which is produced at least in part by fuel burner 14 disposed at the lower end of the chamber 12. While moving along the spiral firing rack 20 the waste is at least partially pyrolyzed within the hot, nonoxidizing atmosphere, thereby decomposing at least a portion of the waste to gaseous material such as are typically produced in a pyrolysis process. The spiral firing rack 20 provides particular advantage in that the waste is caused to be effectively suspended in contact with the non-oxidizing heated atmosphere within the chamber 12 over a sufficiently long period of time to allow effective heating of the waste to at least near the pyrolysis temperature and with at least partial pyrolysis occurring while the waste is actually on the spiral firing rack 20.

At the lower landing end 26 of the spiral firing rack 20 the at least partially pyrolyzed waste is caused to fall from said rack 20 and onto a stepped grating rack 28. The stepped grating rack 28 is disposed immediately beneath the lower landing end 26 of the spiral firing rack 20 and opposite to burner aperture 29 through which heat enters the pyrolysis chamber 12 from the fuel burner 14. The waste falling within the chamber 12 onto the grating rack 28 is fully pyrolyzed while falling and/or once settled onto said grating rack 28. When on the grating rack 28, the waste is disposed in closest proximity to the fuel burner 14 and is accordingly fully and quickly brought up to pyrolysis temperature, if such temperature has not been reached during movement of the waste along the spiral firing rack 20. The stepped individual grating members of the rack 28 allows movement of heated gases therearound to assure complete pyrolysis. The spacing between the members of the stepped grating rack 28 is much greater than is spacing between members which form the spiral firing rack 20, the members forming said rack 20 being spaced apart sufficiently to facilitate upward movement of gases within the chamber 12. As the waste is fully pyrolyzed on the rack 28, residue drops through the rack 28 into a residue collection compactor 30 disposed within the lowermost portion of the housing 11. The residue collection compactor 30 is typically an open ended container of the type manufactured by Marathon Equipment Company of Vernon, Ala. The compactor 30 is provided with wheels or other mobilizing means to enable removal from the system once the compactor is full. Although not shown, the housing 11 is provided with a suitable door such that the system can be shut down to allow the compactor 30 to be removed therefrom in the situation where the entire housing 11 is effectively sealed. Sealing structure (not shown) can be provided between the compactor 30 and the stepped grating rack 28 in order that the chamber 12 can be sealed from the residue collection area within which the compactor 30 resides in order to negative the need for shuting down the pyrolysis system 10 when the need for residue removal occurs.

Energy necessary to produce pyrolysis conditions within the pyrolysis chamber 12 is effectively provided by the fuel burner 14. While the fuel burner 14 can be configured otherwise than is expressly shown in FIGS. 1 and 2, it is deemed advantageous according to a preferred embodiment of the invention to utilize a fuel burning system which is particularly suited to the burning of "green" fuels which are usually considered to be waste materials. In particular, a system which is commercially available from the American Coal Burner and Wood Stoker Corporation of Des Plaines, Illinois, proves particularly suitable in the burning of wet or dry hogged wood, planar shavings, sawdust, sander dust, bark, corn cobs, bagasse, nut hulls, pecan shells, wood and similar materials. Waste material can thus be used to provide fuel to the fuel burner 14. The burner thus referred to effectively gasifies the fuel material for burning. A waste fuel such as wood chips is fed into fuel hopper 32 at a rate of approximately 2400 pounds per hour. The fuel burner 14 at this feed rate has a heating capacity of between 8 and 10 million BTU's per hour, thereby providing a temperature within combustion chamber 37 of the burner 14 of approximately 2500° F. Primary air fed through primary air feed inlet 34 acts with heat according to known principles to gasify the fuel as the fuel is fed over firing grating 38. Secondary air fed through secondary air feed inlet 36 mixes with the heated gasification products to produce an open flame which extends into the combustion chamber 37. This open flame thus provides both radiative and convective heat to the waste material within the pyrolysis chamber 12 in order to produce the pyrolysis reaction within said chamber 12. Although a carbonized bed is effectively formed over the firing grating 38, ash residue is capable of moving through the grating 38 and through ash residue outlet 40 by virtue of hinged door 42 to deposit residue in the residue collection compactor 30.

The fuel hopper 32 of the fuel burner 14 is supplied with fuel material in a known manner by means of commercially available storage and conveyor systems. Firing of the waste fuel material within the fuel burner 14 can also be automatically or otherwise controlled by conventional monitoring and control systems. It should be understood that the fuel burner 14 can comprise a wide variety of fuel burning structures which may use a wide variety of fuels including fossil fuels, water gas produced by the action of water on coke, and other fuels.

Gases produced by the pyrolysis reaction within the pyrolysis chamber 12 are ducted through gas outlets 44 formed in the uppermost portion of the chamber 12. The gas outlet 44 communicating with outlet conduit 46 which ducts the gases to a gas treatment chamber 48. Within the gas treatment chamber 48 or other suitable sub-system, the gaseous pyrolysis products are treated in any conventional manner so that the gaseous products may be utilized in any desired fashion. A particular use for the gaseous products involves burning of said combustible gases produced by the pyrolysis reaction to supplement the heat energy input being directed into the pyrolysis chamber 12. This burning of the gaseous pyrolysis products to augment the pyrolysis reaction can occur either within or in association with the fuel burner 14. It is further to be noted that oxygen intake into the pyrolysis system 10 is chosen to be in accordance with usual practices in the art. A typical oxygen percentage thus used is approximately 40%. It is further to be noted that a limited supply of oxygen can be provided in the area below the stepped grating rack 28 in a region which can be referred to as the "burnout zone". Under such conditions, a portion of the waste would burst into flames and would generate additional energy which would be dependent upon the amount of energy left in the waste at that point, and also dependent upon the quantity of oxygen which is supplied to support spontaneous combustion. Such an oxidation reaction could be used to recover all available energy present in the solid waste in the event that the waste was not completely pyrolyzed.

Figure 3:
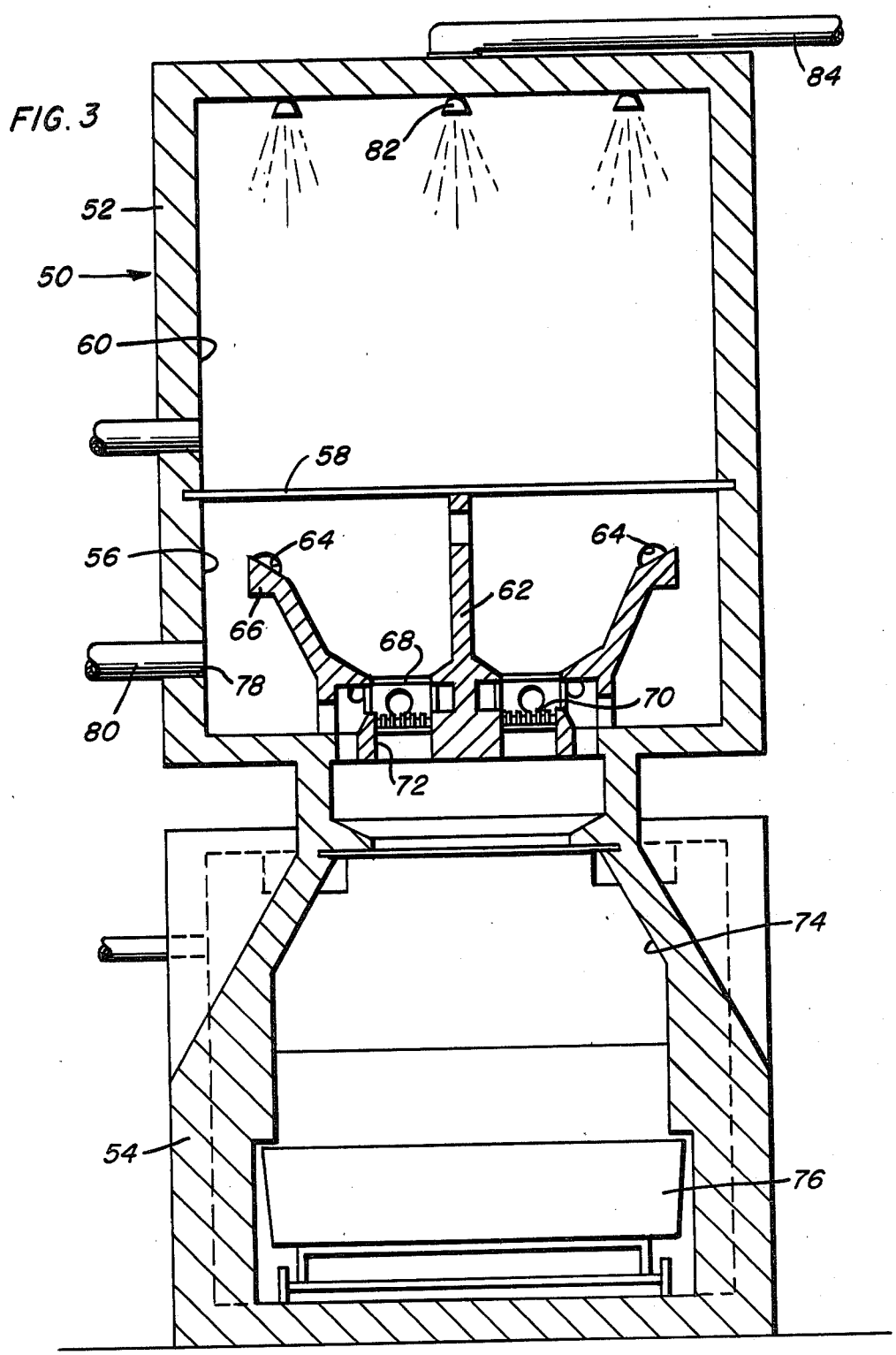
FIG. 3 is an elevational view in partial section of a second embodiment of the invention.

Referring now to FIG. 3, a second embodiment of the invention is seen to comprise a pyrolysis system 50 having upper and lower housings 52 and 54 respectively. The upper housing 52 has a pyrolysis chamber 56 defined therein by lower portions of said upper housing 52 and a heat exchange wall element 58. The upper portion of the upper housing 52 comprises a steam generation chamber 60 which will be described hereinafter. The heat exchange wall element 58 is at least partially supported by support column 62 which extends upwardly within the upper housing 52. Waste which is to be pyrolyzed is charged into the pyrolysis chamber 56 through waste ducts 64 by means of feeding devices (not shown) such as the ram feeder structures described relative to FIGS. 1 and 2. The waste is charged as seen in FIG. 3 by dual waste duct 64 onto respective first firing rack 66 which comprises a grated metallic platform which is of a link which allows the waste to be forced across its surface to an end thereof at which point the waste falls onto a weight-controlled firing rack 68. It is to be understood that the atmosphere of hot, non-oxidizing gases within the pyrolysis chamber 56 is heating the waste during the movement thereof throughout the pyrolysis chamber 56, the waste being at least partially pyrolyzed during this movement through said chamber. The weight-controlled firing rack is also a grated metallic platform, but is weight-sensitive. When a sufficient quantity of waste falls onto the surface of the rack 68, an electronic impulse is triggered by appropriate electronics (not shown) which discontinues operation of feed of waste through the waste duct 64. As the waste on the weight-controlled firing rack 68 is decomposed during a pyrolysis reaction, the weight on the surface of said rack 68 decreases and thus causes feed of waste through the waste ducts to be again continued. As additional waste is fed into the system to cause movement of waste from the first firing rack 66 onto the firing rack 68, the progressively pyrolyzed waste on the firing rack 68 is forced through spaces between the grating of said rack 68 and onto the surface of a third firing rack 70. The spacing between the gratings of the respective firing racks becomes smaller, the spacing between the grating of the third firing rack 70 being smaller than the spaces between the gratings of the firing rack 68.

The third firing rack 70 holds the at least partially pyrolyzed waste in closest proximity to a supplementary fuel burner (not shown) which directs heated gases into the pyrolysis chamber 56, through burner gas inlet 72. Thus, the heated gases entering the pyrolysis chamber act to thoroughly pyrolyze the waste present on the third firing rack 70. That waste which does not fall through the grating of the third firing rack 70 can be dropped from the grating by virtue of the fact that the rack 70 is hinged along one edge for downward movement of the opposite edge to facilitate dislodgment of waste from said rack 70. Ash and char residues are received in residue collection chamber 74 by mobile residue collection hopper 76. The hopper 76 can be configured to have upper edge portions which bias against lower portions of the residue chamber 74 in order to form a seal.

Gas outlet 78 ducts pyrolytically formed gases through outlet conduit 80 in a manner similar to that described relative to the embodiment of FIGS. 1 and 2. The pyrolytically formed gases can then be utilized as described above.

Water distribution conduits 82 are formed within the steam generation chamber 60 to provide water to said chamber 60. Heat exchanged through the heat exchange wall element 58 acts to convert the water so supplied to steam in order that at least a portion of the heat generated within the pyrolysis chamber 56 can be recovered to provide a useful function. A steam removal conduit 84 communicates with the interior of the steam generation chamber 60 so that the steam produced within said chamber 60 can be channeled to a point of use. It is noted that the water provided to the steam generation chamber 60 can be preheated such as by heat exchange with the gaseous pyrolysis products exiting the pyrolysis chamber 56.

Figure 4:
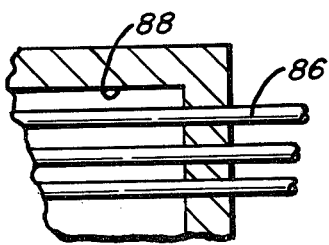
FIG. 4 is an elevational view in partial section of a detailed portion of a modification of the invention illustrating the provision of steam generation piping disposed in an upper portion of a pyrolysis chamber.

Referring now to FIG. 4, it is seen that actual piping 86 can be used to duct water through a chamber 88 which corresponds to the upper portion of a pyrolysis chamber such as the pyrolysis chamber 56 of FIG. 3. Water moving within the piping 86 thus has heat exchanged thereto from the hot gases existing within the chamber 88. Accordingly, steam can be generated to recover heat input into the pyrolysis chamber by direct heat exchange from the pyrolyzing atmosphere.

It is believed that the mode of operation of both explicitly and implicitly described portions of the present pyrolysis apparatus has been made clear from the description given hereinabove. As has been indicated, certain components of the present apparatus are standard items which are available commercially and for which the mode of operation is well known to those skilled in the art. Even though the present invention has been described with specific reference to the treatment of a solid pyrolyzable material, it will be understood that any heatdecomposable non-gaseous material can be processed with the apparatus of the present invention. For example, liquid waste or flowable mixtures of liquid and solid waste can be readily treated using the apparatus of the present invention. Treatment of flowable mixtures is even facilitated relative to solid waste by virtue of the ability to pump such flowable materials into the appropriate portion of the present pyrolysis system 10.

Accordingly, the invention is not to be limited by the express description provided hereinabove, but is to be interpreted in light of such description and in view of the particular definitions of the invention provided by the appended claims.

What is claimed is:

1. Apparatus for pyrolytically treating municipal wastes comprised of heat-decomposable material which, when subjected to direct contact with a hot, non-oxidizing atmosphere, form gaseous pyrolytic decomposition products, comprising:

a generally vertically extending pyrolysis chamber adapted to receive heat energy thereinto for providing a heated, non-oxidizing atmosphere therein;

means for charging the heat-decomposable material into the pyrolysis chamber;

generally vertically disposed at least partially gas transmissive spiral firing rack means within the pyrolysis chamber and extending generally to the inner surface of the wall defining the chamber, said spiral firing rack means being associated with the charging means wherein material to be treated is progressively fed along the firing rack means at least in part by virtue of the movement of material onto said firing rack means by the charging means wherein the material to be treated is subjected to the heated, non-oxidizing atmosphere within the pyrolysis chamber during movement of the material downwardly along the firing rack means;

burner means for charging heated, non-oxidizing gases into the pyrolysis chamber to produce a pyrolytic atmosphere therewithin; and means for removing residues formed by the pyrolysis reaction within the pyrolysis chamber.

2. The apparatus of claim 1 wherein the firing rack means comprise a spiral firing rack extending from a location within an upper portion of the pyrolysis chamber to a location spaced vertically downwardly therefrom, the spiral firing rack having helical surfaces over which the material is moved in a downwardly descending path, thereby to suspend the material within the pyrolyzing atmosphere existing within the pyrolysis chamber.

3. The apparatus of claim 2 wherein the pyrolysis chamber is cylindrical at least at the portion thereof within which the spiral firing rack is located, the outer edges of the spiral firing rack being effectively contiguous to inner walls of the cylindrical portion of the pyrolysis chamber.

4. The apparatus of claim 3 wherein a charging means feed the material onto the spiral firing rack at an uppermost location of the rack and within an uppermost portion of the pyrolysis chamber.

5. The apparatus of claim 3 wherein the firing rack means further comprise a stepped grating rack disposed within the pyrolysis chamber beneath the lower end of the spiral firing rack, waste reaching the lower end of the spiral firing rack falling onto the stepped grating rack, the stepped grating rack being spaced in proximity to the burner means such that material on the stepped grating rack is completely pyrolyzed by convection and radiative heating from said burner means.

6. The apparatus of claim 1 and further comprising means for removing the gaseous pyrolytic decomposition products from the pyrolysis chamber for utilization thereof.

7. The apparatus of claim 6 wherein the last-mentioned means includes means for oxidizing the gaseous pyrolytic decomposition products to produce heated gases which are introduced into the pyrolysis chamber.

8. The apparatus of claim 1 wherein the burner means comprise means for gasifying and burning cellulosic waste materials.

* * * * *